March 17, 1959 W. G. ROBERTSON 2,877,807
COIL WINDING APPARATUS FOR ODD-SHAPED COILS AND THE LIKE
Filed Aug. 6, 1956 2 Sheets-Sheet 2
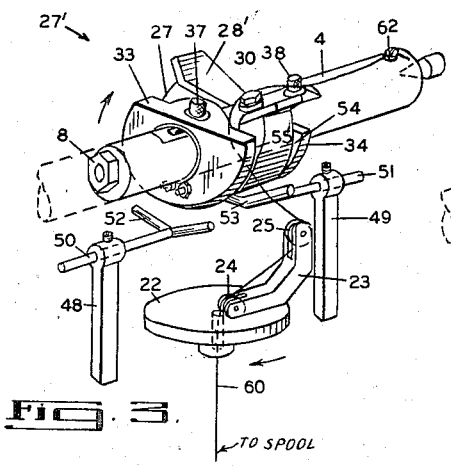
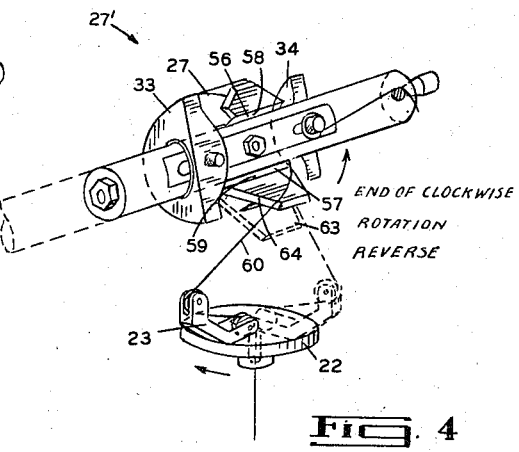
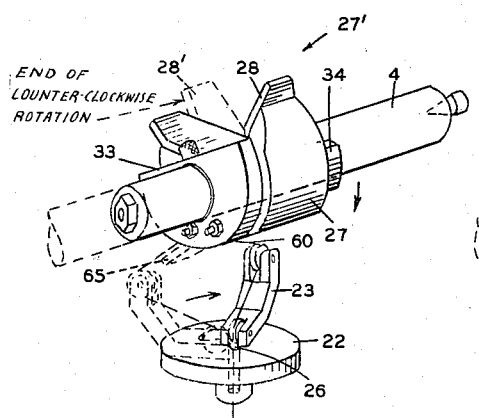
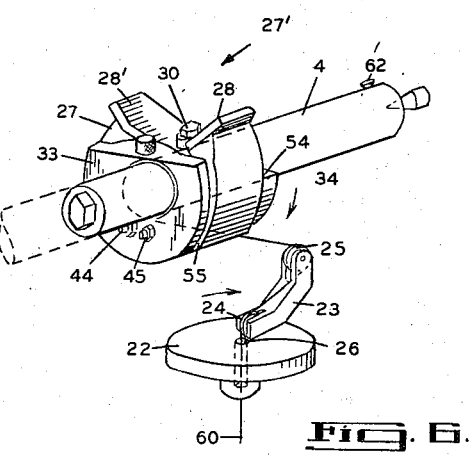
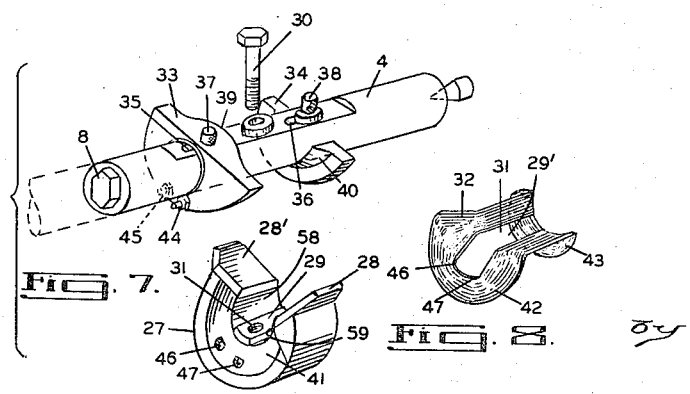
INVENTOR
WILLIAM G. ROBERTSON
ATTY.

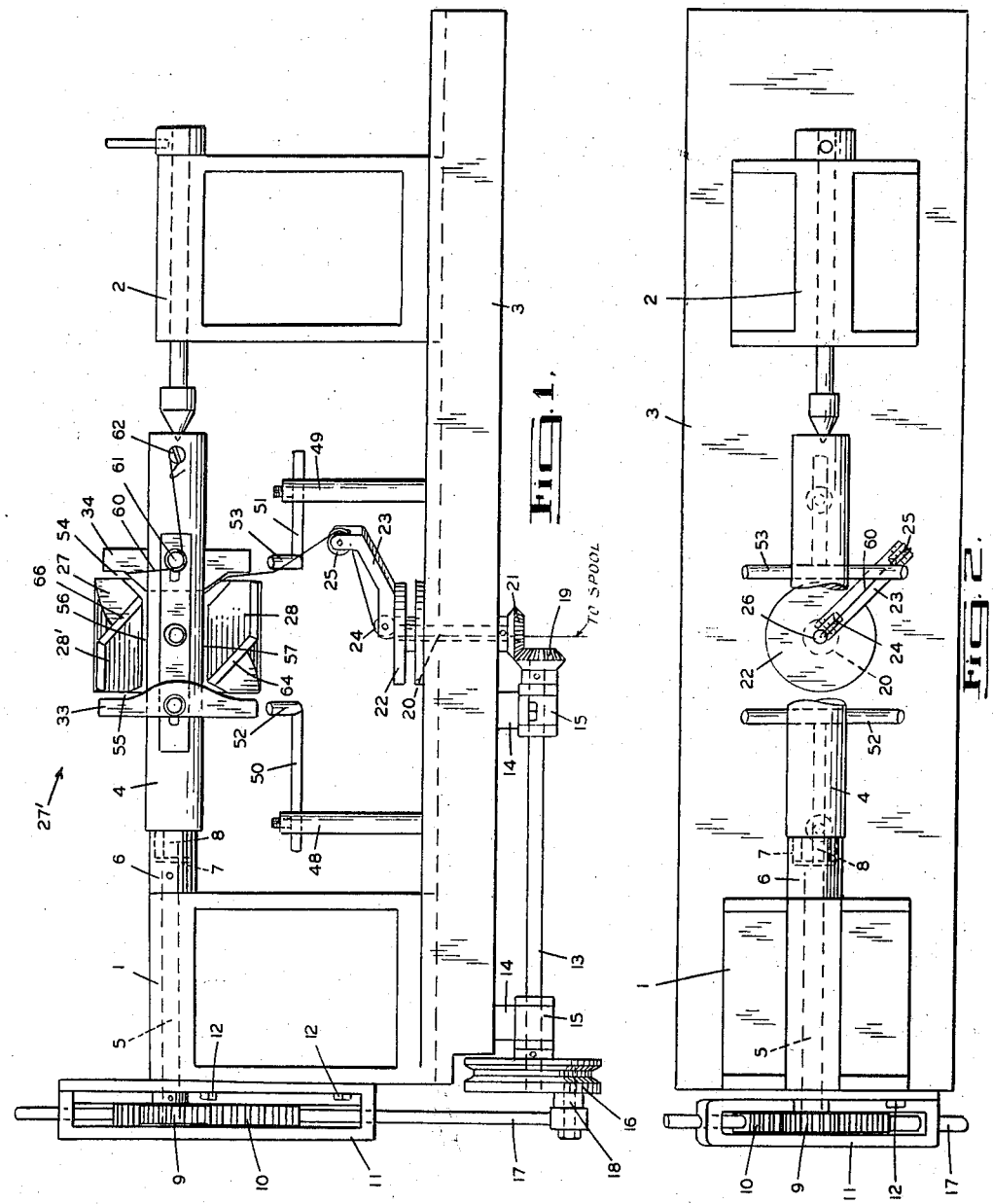

United States Patent Office 2,877,807
Patented Mar. 17, 1959

2,877,807

COIL WINDING APPARATUS FOR ODD-SHAPED COILS AND THE LIKE

William G. Robertson, Toronto, Ontario, Canada, assignor to Rotronic Corporation Limited, Toronto, Ontario, Canada Application August 6, 1956, Serial No. 602,119

10 Claims. (Cl. 140—92.2)

This invention relates to a coil winding apparatus for winding coils of odd shape or saddle shape and the like, particularly, although it may be used for winding coils of regular or conventional configuration.

While machines for winding odd-shaped or saddle-shaped coils and the like are now being used, the apparatus used in these machines tends to subject the wire coated with insulation to excessive tension and bending, the shearing action encountered as a result of the tension and bending endangering shorting of the turns due to voltage break-down under disturbance of the insulation. Similar defects have been encountered with odd-shaped coils formed from a coil of planar or regular configuration which have been bent into the desired shape after the coil has been wound.

It is, therefore, the principal object of this invention to provide a coil winding apparatus for winding odd-shaped coils, and more particularly, saddle-shaped coils for deflection yokes and the like which obviates the disadvantages encountered in the known machines for winding coils.

It is another principal object of this invention to provide a coil winding apparatus as aforesaid in which a coil may be wound very much more quickly than with machines now being employed.

Another object of this invention is to provide a coil winding apparatus wherein a coil may be wound to a desired shape in a single operation.

It is another object of this invention to provide a coil winding apparatus in which the lay of the wire in a coil formed thereon is more uniform than can be presently achieved with known methods.

Again, another object of this invention is to provide a coil winding apparatus which is relatively simple and inexpensive to construct.

The principal feature of this invention resides in providing a coil winding apparatus in which an arbor carrying a coil form on which wire is to be wound is oscillated through a predetermined number of degrees, and an arm is rotated to describe a circular path in a plane spaced from the coil form and arbor and at one side thereof, the arm rotation being synchronized with the oscillation of the arbor, whereby a strand of wire supplied to the arm and led to the coil form is wound on the coil form continuously under the combined oscillatory and rotational movement of the arbor and arm respectively, without undue bending or tensioning.

Another feature of this invention resides in providing a coil winding apparatus as aforesaid in combination with wire guiding means for guiding wire to the coil form whereby uniformity of the lay of the wire is achieved.

Further, another feature of the invention resides in tensioning the wire supplied to the coil form which, in combination with the aforesaid apparatus, produces a tightly wound coil of precise configuration.

These and other objects and features will become apparent when the following description is read in conjunction with the sheets of drawings, in which:

Figure 1 is a front elevational view of an apparatus embodying the invention for carrying out the coil winding operation;

Figure 2 is a plan view, partly broken away, of the apparatus of Figure 1;

Figure 3 is a fragmentary perspective view of the apparatus of Figure 1 showing the initial stage of the coil winding operation;

Figure 4 is a perspective view further to Figure 3, showing the apparatus advanced to the first stage of the coil winding operation;

Figure 5 is a perspective view further to Figure 4, showing the apparatus advanced to the second stage of the coil winding operation;

Figure 6 is a perspective view further to Figure 5, in which the apparatus has completed one cycle of the coil winding operation;

Figure 7 is a perspective, partly exploded view of the apparatus of Figure 1, upon which wire is wound in the form of a coil;

Figure 8 is a perspective view of a coil wound on the apparatus of Figure 1.

According to Figures 1 and 2, the apparatus for winding coils comprises a head-stock 1 and a tail-stock 2 mounted on a table or plate 3.

An arbor 4 is supported between the head-stock 1 and tail-stock 2, and a shaft 5 mounted in the head-stock 1 is operatively connected to the arbor by means of a coupling 6 secured to the shaft by suitable pin means and is recessed as at 7 to receive the head of a nut 8 mounted at one end of the arbor 4 as seen in Figure 7. The shaft 5 which is adapted to be oscillated carries at its outer end a pinion 9 which engages a rack 10 supported in a frame 11 which is secured to the head-stock by fasteners 12.

A driven shaft 13 is supported by hangers 14 from the table or plate 3 and is journalled in suitable journal-bearings 15 and is adapted to be driven by a pulley member 16 operatively connected to one end. The pulley 16 is connected by a belt to a motor or other suitable driving means, which is not shown, to drive the shaft at a selected constant angular velocity.

A crank arm 17 is eccentrically pivoted to the pulley 16 as at 18 to drive the rack 10 and pinion 9, thereby imparting to the arbor 4, through the shaft 5, an oscillatory motion for each revolution of the pulley 16.

A spur gear 19 connected to the driven shaft 13 at its opposite end drives a vertically disposed shaft 20 by means of the operatively associated spur gear 21, the shaft 20 having an axis of rotation perpendicular to the longitudinal axis of the arbor 4, and being connected to a horizontal circular plate 22, upon which is mounted a radially extending and upwardly disposed arm 23. Pulleys 24 and 25 are journalled in slots or recesses at opposite ends of the arm 23 and are adapted to guide a strand of wire 60 being supplied from a spool in the coil winding operation.

The shaft 20 has a central opening 26 through which the wire strand 60 to be wound on a coil form 27' is fed upwardly to the pulleys 24 and 25 on the arm 23 and subsequently to the coil form 27', carried by the arbor 4.

As particularly shown in Figure 7, the arbor 4 has mounted thereon the coil form, generally designated by 27', comprising a generally U-shaped yoke 27 having wire guiding ears 28 and 28', which have opposite symmetry for guiding wire in opposite directions during the coil winding operation.

A plate or form 29 is mounted within the yoke 27 and is adapted to abut the arbor 4 when the yoke is secured by means of a suitable bolt 30 adapted to pass through the arbor and engage the tapped hole 31 in the yoke. As seen in Figure 8, the plate 29 defines a portion 29' of the window 31 of a coil 32 which is wound on the apparatus.

Mounted adjacent to the ends of the yoke 27 are cheek forms 33 and 34 which can be adjusted or spaced in slots 35 and 36 formed in the arbor. Suitable locking screws 37 and 38 are used to fix the position of the cheek forms 34 in spaced relation to the yoke 27. Bosses 39 and 40 formed in the cheek forms 33 and 34 and coupled with the grooving of the yoke form 27, as at 41, define the flared configuration of the coil 32, as seen in Figure 8 at 42 and 43, respectively. A pair of spacer bolts 44 and 45 pass through the cheek form 33 and register with depressions 46 and 47 in the yoke form to define the limits of the window 31 in the flared portion 42 of the saddle-shaped coil 32 as at 46 and 47.

A pair of supports 48 and 49 are supported by the table 3 and carry T-shaped guide means 50 and 51, the outwardly extending arms 52 and 53 of the T-shaped members 50 and 51, respectively, having a somewhat angular configuration as seen in Figure 3, and are spaced from the cheek forms 33 and 34, as shown only in Figures 1, 2 and 3 for purposes of clarity. The outwardly extending arms 52 and 53 of the guide members 50 and 51 are adapted to guide the wire being supplied to the coil from the arm 23 into part-circular transverse slots 54 and 55 defined by the arbor 4, the yoke form 27 and the cheek forms 33 and 34.

As will be seen particularly in Figures 1, 3, 4, 5 and 6, the arbor 4 defines with the associated yoke form part-circular longitudinal slots 56 and 57 defined by the inner surfaces 58 and 59, respectively, of the yoke 27 and arbor 4, the longitudinal slots 56 and 57 being in communication at the opposite ends with the part-circular transverse slots 54 and 55.

Prior to setting the arbor 4 and the arm 23 in motion, a strand of wire 60 to be wound into a coil is led from a spool, not shown, which is subjected to tensioning means, upwardly through the conduit or central opening 26 in the shaft 20, which rotates the circular plate 22. The strand of wire 60 is then placed over the pulley 24 and around the pulley 25 located in the upper end of the arm 23, passing upwardly beneath the arbor into the slot 54. The wire 60 emerges from the slot 54 on the upper side of the arbor and passes around the locking screw 38 to position the wire in proper relation to the slot 54, and is then secured to a fixed point on the arbor 4 by a bolt 63.

According to the mode of operation, the rotary wire supplying means comprising the plate 22 and the arm 23 has an axis of rotation perpendicular to the longitudinal axis of the arbor 4 so that the point on pulley 25 at which the strand of wire 60 leaves the arm 23, traces a circular path which is at all times beyond the periphery of the yoke 27 and associated cheek forms 33 and 34, and lies in a plane spaced from the yoke 27, cheek forms 33 and 34 and arbor 4, and at one side thereof.

The driven shaft 13, driven by the pulley 16, rotates the plate 22 and arm 23 at a desired constant angular velocity, and at the same time the pulley 16 drives the rack 9 and pinion 10 to oscillate the arbor. The rotation of the arm 23 and the oscillation of the arbor 4 are synchronized so that the open side of the yoke 27 is presented to the arm 23 at diametrically opposite positions on opposite sides of the arbor in the path of the rotating arm 23 so that the strand of wire 60 can be led into the longitudinal channel formations 56 and 57, and after leaving channels 56 and 57 can be led into the transverse channel formations 54 and 55, respectively, as the arm rotates through an arc on its path of revolution beyond the diametrically opposite positions. The combined movement of the rotating arm and the oscillating arbor 4 winds wire continuously on the coil form to produce a tightly wound coil of a desired shape.

As best seen in Figure 3 when the open side of the yoke is upwardly disposed, the strand of wire 60, being supplied from the spool, is positioned substantially axially of the yoke 27 and cheek forms 33 and 34 by the arm 23 on its path of revolution beyond the diametrically opposite positions, so that the wire is being led into a portion of the transverse part-circular slot 54 around the guide arm 53.

From the position in Figure 3, the arbor 4 is oscillated by the rack and pinion 9 and 10 through the movement of the pulley 16, clockwise, and at the same time the plate 22 is rotated clockwise by the driven shaft 23 through the spur gears 19 and 21 to move the flying arm 23 to the position shown in broken lines in Figure 4. As the arbor moves to the end of the oscillation, the open side of the yoke 27 is presented to the arm 23, so that the strand of wire 60 being supplied to the transverse part-circular slot 54 clears the corner 63 of the ear 28 and enters the outer end portion of the longitudinal slot 57. As the arbor 4 begins its anti-clockwise movement, the arm 23 continues in its path of rotation, and the strand of wire 60 is guided by the ear 28 and bevelled portion 64 of the ear 28 into the longitudinal slot 57, as shown in solid lines in Figure 4.

As shown in broken lines in Figure 5, the arm 23 has continued in its path of rotation to the opposite side of the arbor 4, and the yoke 27 has been moved by the arbor 4 to the end of the anti-clockwise rotation to present the open side of the yoke 27 to the arm 23. Under the anti-clockwise movement of the arbor 4 and the rotation of the arm 23, the strand of wire 60 descends into the slot 57 adjacent to the form or plate 29 carried by the yoke 27 and passing under the guide arm 52, and descends into the part-circular transverse slot 55 around the spacer bolts 44 and 45. The strand of wire 60 in Figure 5 is shown in broken lines clearing the corner 65 of the ear 28', and is about to enter the longitudinal slot 56.

As shown in solid lines in Figure 5, the arm 23 and yoke 27 have been moved to a position corresponding to the position of the arm 23 and yoke 27, shown in Figure 4, so that the strand of wire 60 has partially entered the longitudinal slot 56 and is being guided by the ear 28' and the bevelled portion 66 of the ear 28' into the slot 56.

In Figure 6 the yoke 27 is shown approaching the mid position of the clockwise rotation with the arm 23 extending axially thereof, which has placed the strand of wire 60 partly in the slot 54, the strand of wire being guided by the guide arm 53, not shown.

Successive laps of the coil are wound on the coil form as described until a coil of the configuration as shown in Figure 8 has reached the required dimensions. The strand of wire 60 is then severed from the spool and the arbor 4 and the associated coil form in which the coil is wound is removed from the head and tail stock.

Prior to removing the coil from the coil form, electrical potential is applied to the coil to bond the insulation coated on the wire and, where desired, the coil is sized by applying pressure to the coil periphery in the slots. This latter step is employed where the outer laps of wire have climbed in the slots and a slight reforming of the periphery is desirable to ensure a precise configuration.

It will be appreciated that although the preferred form of a coil winding apparatus has been described and illustrated, various other modifications may be made without departing from the scope of the invention as set out in the appended claims.

What I claim as my invention is:

1. In a coil winding apparatus the combination with a coil form having an axis of oscillation and longitudinal and transverse guide formations alternately arranged around said axis, of a rotary wire guiding formation having an axis of rotation perpendicular to said axis of oscillation and including a wire delivery means spaced radially of said axis of rotation, said wire guiding formation being adapted, to be rotated continuously in one direction, to move said wire delivery means in a circular path spaced from said coil form and at one side thereof, said wire delivery means being adapted to supply a continuous strand of wire to said coil form throughout its travel in said circular path.

2. In a coil forming apparatus, the combination with a coil form having an axis of oscillation and longitudinal and transverse guide formations alternately arranged around said axis, of a rotary wire guiding formation mounted for rotation about an axis perpendicular to said axis of oscillation and carrying a radially extending arm formation including wire delivery means, for delivering wire to said coil form, said wire guiding formation, being adapted to be rotated in one direction to move at constant angular velocity said radially extending arm in a circular path spaced from said coil form and at one side thereof, said wire delivery means tracing a circle and being adapted to supply a continuous strand of wire to said coil form throughout its travel.

3. In a coil forming apparatus, a coil form having an axis of oscillation and longitudinal transverse guide formations alternately arranged around said axis, a rotary wire guiding formation mounted for rotation about an axis perpendicular to said axis of oscillation and carrying a radially extending arm formation including wire delivery means spaced from said axis of rotation, means for rotating said wire guiding formation in one direction at constant angular velocity and means for oscillating said coil form to present each longitudinal guide formation to said wire delivery means at diametrically opposite positions in the circular path of travel of said radially extending arm for one revolution of said wire guiding formation whereby a continuous strand of wire is led alternately, longitudinally and transversely onto said coil form.

4. A coil winding apparatus for winding coils for a sweep yoke assembly and the like comprising an arbor, a mounting for said arbor, a coil form having an axis of oscillation and a pair of longitudinal and transverse guide formations alternately arranged around said axis to receive and guide wire to be wound thereon, rotary wire supplying means for supplying wire to said coil form and having an axis of rotation perpendicular to the longitudinal axis of said arbor and said rotary wire supplying means including wire delivery means spaced from said axis of rotation, said wire supplying means on being rotated, moving said wire delivery means in a circular path spaced from said coil form and at one side of its axis of oscillation, said wire delivery means being adapted to supply a continuous strand of wire to said coil form throughout its travel in said circular path, to loop a strand of wire around said coil form and into said guide formations, means for rotating said rotary wire supplying means and means for oscillating said arbor to present each longitudinal guide formation of said coil form to said rotary wire supplying means at diametrically opposite positions in its path of rotation for one revolution of said rotary wire supplying means whereby a loop of wire is led alternately longitudinally and transversely into said coil form.

5. A coil winding apparatus according to claim 4 in which said coil form comprises a yoke and cheek forms mounted on said arbor and defining therewith alternately longitudinal and transverse coil forming slot formations with respect to said axis, said longitudinal coil forming slot formations having wire guiding means for guiding a strand of wire from said transverse slot formations into said longitudinal slot formations.

6. A coil winding apparatus as in claim 4 in which said rotary wire guiding means comprises a rotatable arm mounting having an axis of rotation and having conduit means located in said arm mounting concentric with said axis of rotation for supplying a strand of wire therethrough, a radially extending arm carried by said arm mounting and having guide means to guide a strand of wire supplied through said conduit along said arm, a strand of wire being adapted to leave said arm at a point radially spaced from said axis of rotation, said latter point upon rotation describing a peripheral circular path relative to said coil form and spaced therefrom, whereby wire is supplied to said coil form, in the form of a loop and wound thereon under the combined oscillating and rotational movement of said coil form and arm mounting respectively.

7. A coil winding apparatus according to claim 4 in which a strand of wire being fed to said coil form is tensioned by tensioning means to achieve a tightly wound coil.

8. A coil winding apparatus according to claim 5 in which means are provided to adjust the spacing of said yoke, arbor and cheek forms to provide a coil form of a precisely predetermined configuration.

9. A coil winding apparatus according to claim 8 in which guide means are mounted in spaced relation to said cheek forms for guiding wire from said longitudinal slot formations into said transverse slot formations.

10. A coil winding apparatus for winding coils for a sweep yoke assembly and the like, comprising an arbor, a mounting for said arbor, a yoke and cheek forms carried by said arbor and defining therewith a coil form on which wire is adapted to be wound, said yoke and cheek forms presenting a pair of spaced longitudinal coil-forming slot formations interconnecting with a pair of spaced part-circumferential coil-forming slot formations, rotary wire guiding means for guiding a strand of wire into said coil-forming slot formations comprising a radially extending arm formation mounted for rotation about an axis perpendicular to the longitudinal axis of said arbor, a conduit formed in said arm formation concentric with the axis of rotation through which a strand of wire is adapted to be supplied and wire delivery means carried by said arm formation and being adapted to lead a strand of wire from said conduit along said arm and to deliver the strand of wire to said coil form from a point radially of said axis of rotation, said latter point upon rotation of said arm, tracing a circular path spaced from said coil form and being adapted to lead a strand of wire sequentially into said longitudinal coil-forming slot formations and part-circumferential coil forming slot formations, means for rotating said radially extending arm formation and means for oscillating said arbor to present each longitudinal coil-forming slot formation to said arm formation on opposite sides of said arbor for one revolution of said arm formation, whereby the combined movement of said rotating arm formation and oscillating coil form are adapted to continuously wind a strand of wire on said coil form in a tight, precise configuration.

References Cited in the file of this patent

UNITED STATES PATENTS

| | | |
|---|---|---|
| 2,448,672 | Knauf | Sept. 7, 1948 |
| 2,496,913 | Grundman | Feb. 7, 1950 |
| 2,533,506 | Richard | Dec. 12, 1950 |
| 2,565,331 | Torsch | Aug. 21, 1951 |
| 2,606,723 | Burdulis | Aug. 12, 1952 |